United States Patent [19]

Yamanashi

[11] Patent Number: 5,278,357

[45] Date of Patent: Jan. 11, 1994

[54] ELECTRIC WIRE HOLDING CASE PREVENTING OF OIL LEAK

[75] Inventor: Makoto Yamanashi, Shizuoka, Japan

[73] Assignee: Yazaki Corporation, Tokyo, Japan

[21] Appl. No.: 822,884

[22] Filed: Jan. 21, 1992

[30] Foreign Application Priority Data

Feb. 14, 1991 [JP] Japan ................................. 3-40672

[51] Int. Cl.[5] ............................................. H02G 3/22
[52] U.S. Cl. .................................. 174/151; 174/65 R;
174/77 R; 174/76; 174/22 R; 439/936
[58] Field of Search ....... 174/151, 77 R, 65 R, 65 SS,
152 R, 22 R, 76; 29/857, 29/858, 869;
439/204, 521, 936

[56] References Cited

U.S. PATENT DOCUMENTS 1,742,312 1/1930 Hagel .
4,332,975 6/1982 Dienes ................................. 174/76
4,454,381 6/1984 Ito et al. .............................. 174/151
4,607,469 8/1986 Harrison ........................... 174/77 R

FOREIGN PATENT DOCUMENTS 61-107165 7/1986 Japan .
1-59467 12/1989 Japan .

Primary Examiner—Leo P. Picard
Assistant Examiner—Hyung S. Sough
Attorney, Agent, or Firm—Sughrue, Mion, Zinn, Macpeak & Seas

[57] ABSTRACT

An electric wire holding case which prevents oil from leaking through an electric wire extending into the oil cover of a transmission case or the like. A body and a lid-like holder are included; a partition wall having electric wire insertion holes is provided inside the cylindrical portion of the body; partition chambers are defined on the wall in such a manner that the chambers communicate with the holes at one end of each of the chambers and are open at the other ends thereof; the holder has electric wire insertion holes, and resin injection holes; an engagement member is secured to the exposed portion and accommodated in the chamber corresponding thereto; the chamber is closed at the latter end thereof by the holder; and the resin, which has a softness after being set, is filled into the chamber through the resin injection hole and solidified in the chamber.

9 Claims, 3 Drawing Sheets

ELECTRIC WIRE HOLDING CASE PREVENTING OF OIL LEAK

BACKGROUND OF THE INVENTION

The present invention relates to an electric wire holding case which prevents oil from leaking through an electric wire extending into the oil cover of a transmission case or the like.

FIG. 4 is a longitudinally sectional view of a conventional electric wire holding case B which prevents oil from leaking through electric wires 51a and 51b extending into the oil cover 41 of a transmission case and was disclosed in the Japan Patent Examined Publication No. Hei. 1-59467. The case B has a cylindrical body 40, and a rubber plug 52. The body 40 is made of a synthetic resin and secured in the hole 45 of the oil cover 41 at an engagement claw 43 and a flange 44 which are provided on the peripheral portion of the body. A reference numeral 42 in FIG. 4 shows the interior of the transmission case. An O-ring 46 is fitted in the peripheral portion of the case body 40 to seal the portion to prevent the oil from leaking through between the portion and the oil cover 41. The conductors 49a and 49b of the electric wires 51a and 51b are exposed by peeling the insulators 48a and 48b thereof at one end of each of the wires, and then connected to each other by a terminal 50. The electric wires 51a and 51b are laid inside the inner portion 47 of the case body 40. The rubber plug 52 is fitted in the inner portion 47 at one end thereof. The insulator-unpeeled portion of the wire 51a is laid through the rubber plug 52 so that the wire is sealed on the insulator 48a thereof by the plug. A synthetic resin 52, which is such as an epoxy resin and hardens when being set, is filled and solidified inside the inner portion 47 at the other end thereof so that the exposed conductors 49a and 49b of the electric wires 51a and 51b are embedded in the resin. The conductors 49a and 49b are exposed for one purpose of connecting them to each other, and another purpose of causing the resin 52 to stop the oil coming through between the insulator 48a and conductor 49a of the electric wire 51a due to capillary attraction. A waterproof cover 55 of rubber is fitted on the body 40 of the holding case B around the electric wire 51b. Since the resin 52 is solidified to firmly adhere to the inner surface 53 of the case body 40, the joint 54 of the conductors 49a and 49b is firmly held to prevent the electric wires 51a and 51b from going out of the holding case B. However, since the resin 52 is solidified to harden, it does not follow the conductors 49a and 49b in the thermal expansion and contraction thereof well enough and is likely to undergo a crack to let the oil leak. This is a problem. Besides, it is difficult to position the joint 54 of the conductors 49a and 49b in the body 40 of the holding case B in embedding the joint therein. This is also a problem.

SUMMARY OF THE INVENTION

The present invention was made in order to solve the above-mentioned problems. Accordingly, it is an object of the invention to provide an electric wire holding case which prevents oil from leaking through an electric wire and is good in oil sealing property and easy to position the exposed portion of the conductor of the electric wire in the body of the case.

The portion of the conductor, which is placed in an oil cover, is exposed by peeling the insulator of the electric wire at the portion. The exposed portion of the conductor is embedded in a molded resin in the cylindrical body of the case so that the electric wire is liquid-tightly held by the case to prevent the oil from leaking from inside the oil cover through the wire. The case is characterized in that the case includes the cylindrical body, and a lid-like holder; a partition wall having electric wire insertion holes is provided inside the cylindrical portion of the body of the case; partition chambers are defined on the partition wall in such a manner that the chambers communicate with the insertion holes at one end of each of the chambers and are open at the other ends thereof; the holder has electric wire insertion holes, and resin injection holes; and engagement member is secured to the exposed portion of the conductor and accommodated in the partition chamber corresponding thereto; the chamber is closed at the latter end thereof by the holder; and the resin, which has a softness after being set, is filled into the chamber through the resin injection hole and solidified in the chamber.

Since the engagement member is secured to the electric wire and held in the partition chamber of the body of the case between the partition wall and the holder, it is easy to position the exposed portion of the conductor of the wire in the case body to efficiently fill the resin into the chamber. Since the partition wall and the holder keep the engagement member from going out of the partition chamber, the resin does not need to function to secure the electric wire in the chamber and is therefore allowed to be a resin which has a softness after being set and follows the conductor of the wire in the thermal expansion and contraction thereof well enough to seal the wire well.

DETAILED DESCRIPTION OF EXEMPLARY EMBODIMENT

An embodiment of the present invention is hereafter described in detail with reference to the drawings attached hereto.

Figure 1:
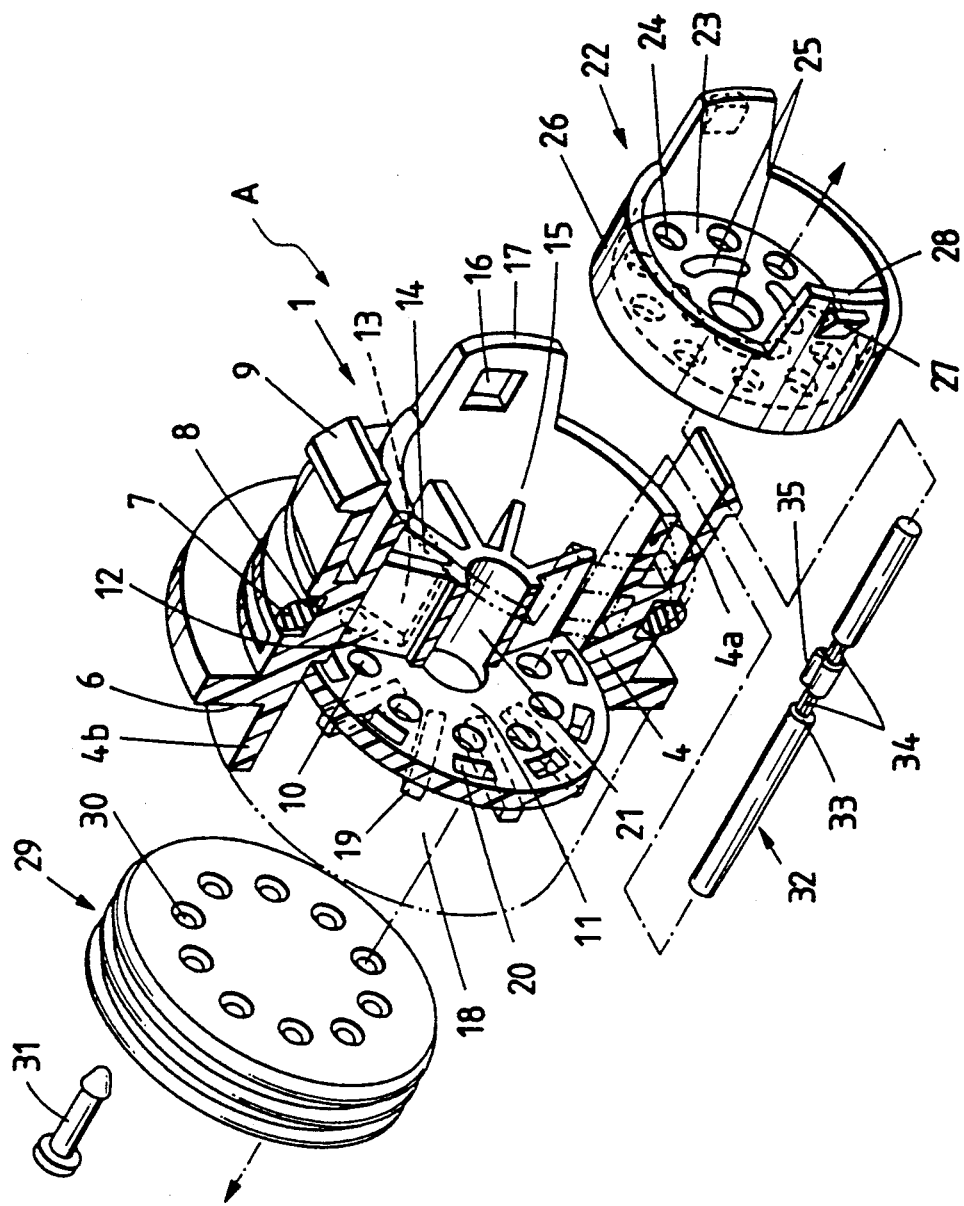
FIG. 1 is an exploded perspective view of an electric wire holding case which prevents oil from leaking through an electric wire and is an embodiment of the present invention.
Figure 2:
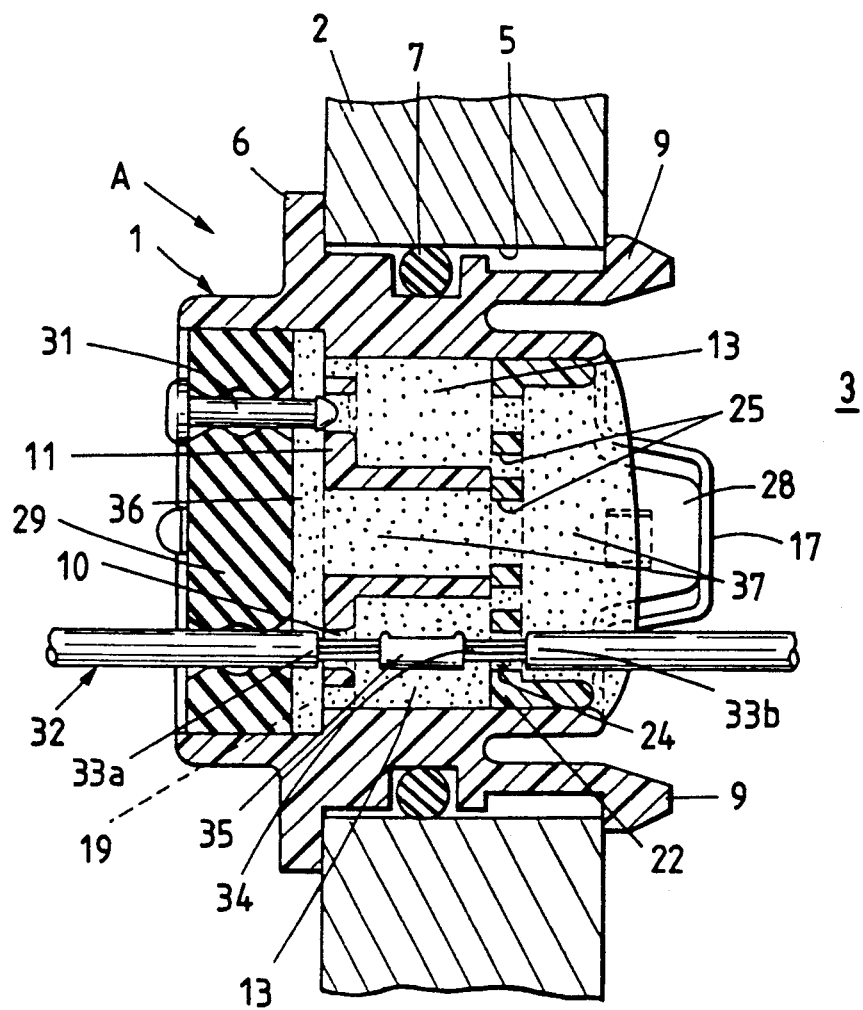
FIG. 2 is a longitudinally sectional view of the case.

FIGS. 1 and 2 show an electric wire holding case A which prevents oil from leaking through electric wires and is the embodiment. The case A is fitted in the hole 5 of the oil cover 2 of a transmission case or the like. A reference numeral 3 in FIG. 2 shows the interior of the transmission case or the like. The case A includes a body 1 made of a synthetic resin, a rear holder 22 made of a synthetic resin, and a waterproof rubber plug 29. The case body 1 has a rear cylindrical portion 4a, a front cylindrical portion 4b, a flange 6, and a pair of flexible engagement claws 9. The peripheral surface of the rear cylindrical portion 4a has a groove 8 in which an O-ring 7 is fitted for sealing. The flange 6 is formed on the peripheral surface of the front cylindrical portion 4b, and located on the oil cover 2 at the hole 5 thereof. The claws 9 project from rear cylindrical portion 4a in parallel with the axis thereof.

As shown in FIG. 1, a partition wall 11 having a plurality of electric wire insertion holes 10 on a circle is provided inside the rear cylindrical portion 4a. Partition fins 12 are radially provided on the partition wall 11 around the center thereof in such a manner that a plurality of partition chambers 13 are defined by the partition wall and the partition fins. The chambers 13 communicate with the electric wire insertion holes 10 of the partition wall 11 at one end of each of the chambers, and are open at the other ends 14 thereof toward the interior 3 of the transmission case or the like. A chamber 15 surrounded by the rear cylindrical portion 4a communicates with the open ends 14 of the partition chambers 13. Lugs 17 having engagement holes 16 project from the rear ends of the rear cylindrical portion 4a. A chamber 18 surrounded by the front cylindrical portion 4b, which extends forward from the oil cover 2, is located on the front of the partition wall 11. Ribs 19 are radially provided on the front of the partition wall 11 around the center thereof, and located alternately to the electric wire insertion holes 10. The partition wall 11 has resin passage holes 20 outside the electric wire insertion holes 10. Another resin passage hole 21 extends through the partition wall 11 and inside the partition fins 12.

The rear holder 22 is fitted in the chamber 15 of the body 1 of the holding case A, and includes a circular wall 23 which has a plurality of electric wire insertion holes 24 corresponding to the partition chambers 13 of the case body 1 and has a plurality of resin injection holes 25. The rear holder 22 also includes a pair of engagement lugs 28 which project from the rear end of the circumferential portion 26 of the holder and have engagement projections 27 which are engaged in the engagement openings 16 of the case body 1. The circumferential portion 26 extends to the circular wall 23.

The waterproof rubber plug 29 is fitted in the chamber 18 of the case body 1, and has a plurality of electric wire fitting holes 30 relatively small in diameter and corresponding to the electric wire insertion holes 10 of the partition wall 11. Shown at 31 in FIG. 2 is a plug made of a synthetic resin so as to be fitted in the electric wire fitting hole 30 if none of the electric wires 32 is inserted into the hole.

Figure 3:
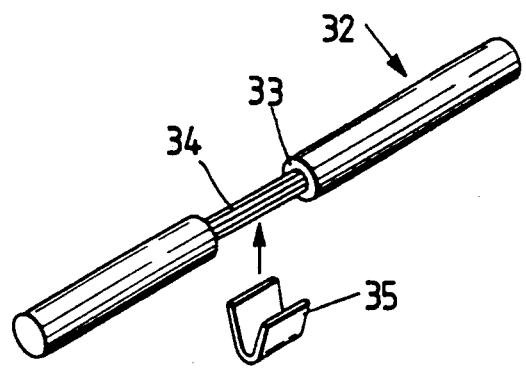
FIG. 3 is a perspective view of an engagement member to illustrate the securing thereof to the electric wire.
Figure 4:
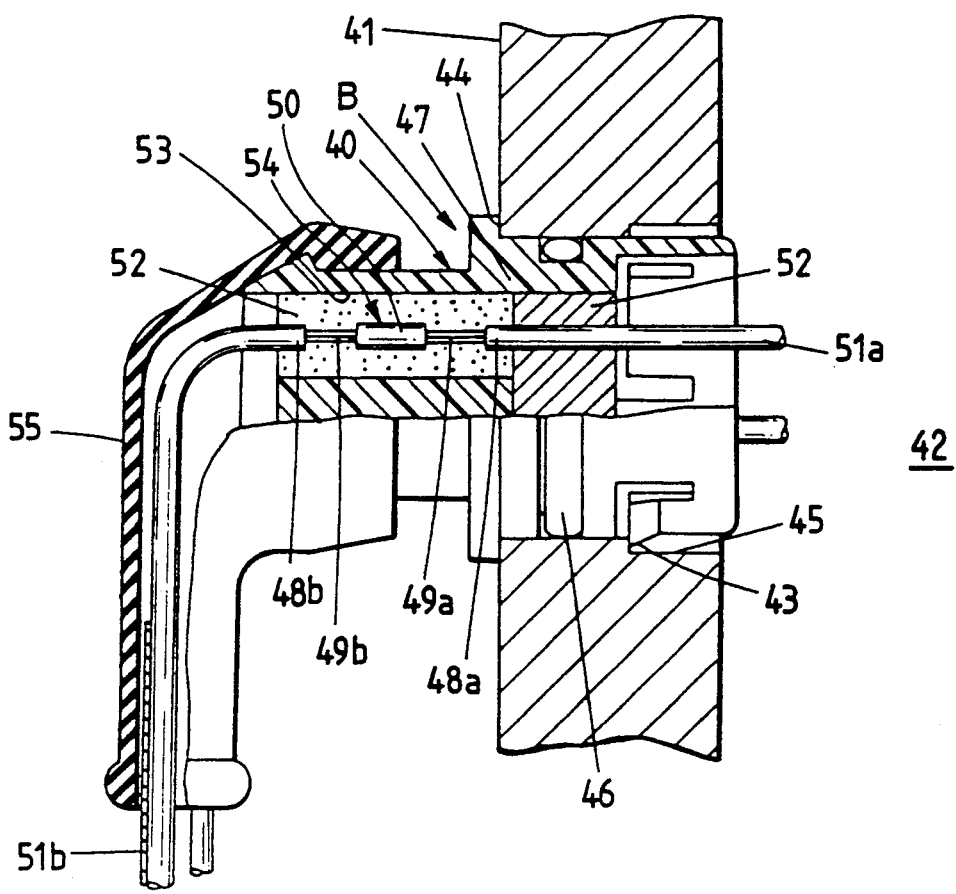
FIG. 4 is a longitudinally sectional view of a conventional electric wire holding case.

The electric wires 32 are laid outward from the interior 3 of the transmission case or the like through the electric wire holding case A fitted in the oil cover 2. Each of the wires 32 is removed of the insulator 33 thereof at the halfway portion of the wire, and an engagement member 35 such as a metal plate is calked on the exposed conductor 34 of the halfway portion of the wire, as shown in FIGS. 2 and 3. The engagement member 35 is for preventing the electric wire 32 from moving in the longitudinal direction thereof in the partition chamber 13 of the case body 1, and may therefore be replaced with anything like the member. To obtain a higher electric conductivity, the electric wire 32 is not composed of two wires connected to each other at the engagement member 35 as in the above-described conventional art. However, the electric wire 32 may be composed of two wires connected to each other at the engagement member 35 as in the art. One end of the electric wire 32 is inserted through the electric wire insertion hole 24 of the rear holder 22, and the other end of the wire is inserted through the partition chamber 13 and electric wire insertion hole 10 of the holding case body 1 and the electric wire fitting hole 30 of the rubber plug 29. The engagement member 35 is accommodated in the partition chamber 13. The rear holder 22 is fitted in the chamber 15 of the case holder 1 so that the engagement member 35 is held between the circular wall 23 of the rear holder and the partition wall 11 of the case body 1. The rubber plug 29 is fitted in the chamber 18 of the case body 1 so that a gap 36 whose thickness is equal to that of the rib 19 is defined between the rubber plug and the partition wall 11.

As shown in FIG. 2, a resin 37, which is such as a silicone resin and has a softness after being set, is filled into the partition chambers 13 and the gap 36 through the resin injection holes 25 of the rear holder 22 so that the exposed conductors 34 of the electric wires 32 and the ends 33a of the front portions of the insulators 33 of the wires are embedded in the resin. The resin 37 is also filled into the internal opening of the rear holder 22 so that the ends 33b of the rear portions of the insulators 33 of the electric wires 32 are embedded in the resin. The set resin 37 follows the conductors 34 of the wires 32 even in the thermal expansion and contraction thereof well enough to seal them well and not to undergo a crack.

The present invention is not confined to the above-described embodiment, but may be embodied or practiced in other various ways without departing from the scope and spirit of the invention.

What is claimed is:

1. An electric wire holding case for holding at least one electric wire to be introduced into the inside of an oil cover and preventing oil from leaking from the inside of said cover through said wire, comprising:

a cylindrical body formed inside thereof with a partition wall having first electric wire insertion holes, said cylindrical body with said partition wall defining a partition chamber communicating with said first electric wire insertion holes at one end thereof and being open at the other end thereof;

an engagement member secured onto each electric wire at a portion where the insulator of said wire is peeled to expose the conductor thereof;

retaining means, fixedly secured to said cylindrical body, for fixedly retaining said engagement member in said partition chamber even when an external force is applied to said wire, said retaining means including a lid-like holder having second electric wire insertion holes and resin injection holes, wherein each electric wire is held through said first and second electric wire insertion holes while placing said engagement member within said partition chamber; said partition chamber is closed at the latter end thereof by said holder; and a resin is injected into said chamber through said resin injection holes and solidified in said chamber and on both sides of said lid-like holder, thereby embedding said portion in said resin and holding said electric wire in place, said solidified resin being sufficiently soft so that it is capable of expanding and contracting with corresponding expansion and contraction of the exposed conductors.

2. The case according to claim 1, wherein said resin includes a silicone resin.

3. The case according to claim 1, wherein said cylindrical body, said partition wall and said holder are made of synthetic resins.

4. The case according to claim 1, wherein said partition wall includes a plurality of partition fins for dividing said partition chamber into a plurality of small partition chambers, each of said small partition chambers communicating with corresponding one of said first electric wire insertion holes and corresponding one of said second electric wire insertion holes.

5. The case according to claim 1, wherein said engagement member has such a configuration that said engagement member is prevented from passing through said first and second electric wire insertion holes.

6. The case according to claim 1, further comprising: means for sealingly attaching said cylindrical body onto a hole provided in said oil cover.

7. The case according to claim 1, further comprising means for closing said first electric wire insertion holes into which no electric wire is inserted.

8. The case according to claim 1, wherein said partition wall includes ribs extending therefrom opposite to said partition chamber, and further comprising a waterproof rubber plug fitted in said cylindrical body with a gap between said plug and said partition wall through said ribs.

9. A method of sealingly holding at least one electric wire to be introduced into the inside of an oil accommodating chamber, comprising the steps of:

providing a substantially cylindrical case having, at the inside thereof, a partition wall formed with first electric wire insertion holes;

providing a lid member to be combined with said cylindrical case for defining a resin accommodating chamber inside said cylindrical case in cooperation with said partition wall, said lid member being formed with second electric wire insertion holes respectively opposed to said first electric wire insertion holes through said resin accommodating chamber and with resin injection holes;

peeling the insulator of each electric wire at a portion to expose the conductor thereof;

fixing an engagement member onto said portion of each electric wire, said engagement member having a predetermined size for preventing said engagement member from passing through said first and second electric wire insertion holes;

inserting one end of each wire into corresponding one of said first electric wire insertion holes and the other end thereof into corresponding one of said second electric wire insertion holes so as to position said engagement member between said partition wall and said lid member;

fixedly securing said lid-like member to said cylindrical case;

injecting and fitting a resin into said resin accommodating chamber through said resin injection holes such that said resin surrounds said exposed conductors and is disposed on both sides of said lid member to prevent oil from leaking through the inside of said cylindrical case;

allowing said resin to solidify, said solidified resin being sufficiently soft to expand and contract with corresponding expansion and contraction of said exposed conductors; and sealingly engaging said cylindrical case with a hole provided in a cover defining said oil accommodating chamber.

* * * * *